Oct. 20, 1953 A. C. PETERSON 2,655,997
HELICOPTER ROTOR ACTUATION AND CONTROL
Filed Feb. 24, 1949 3 Sheets-Sheet 2
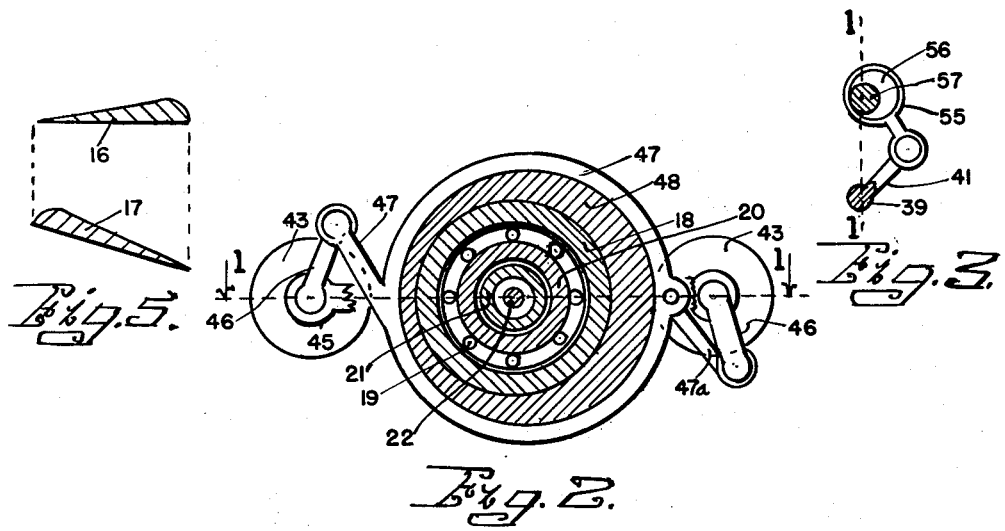
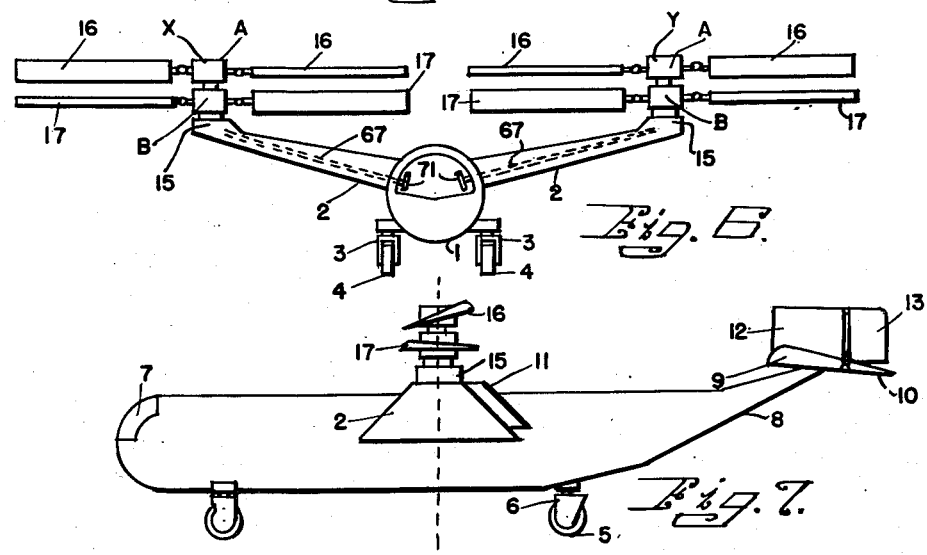
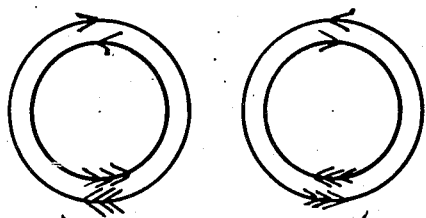

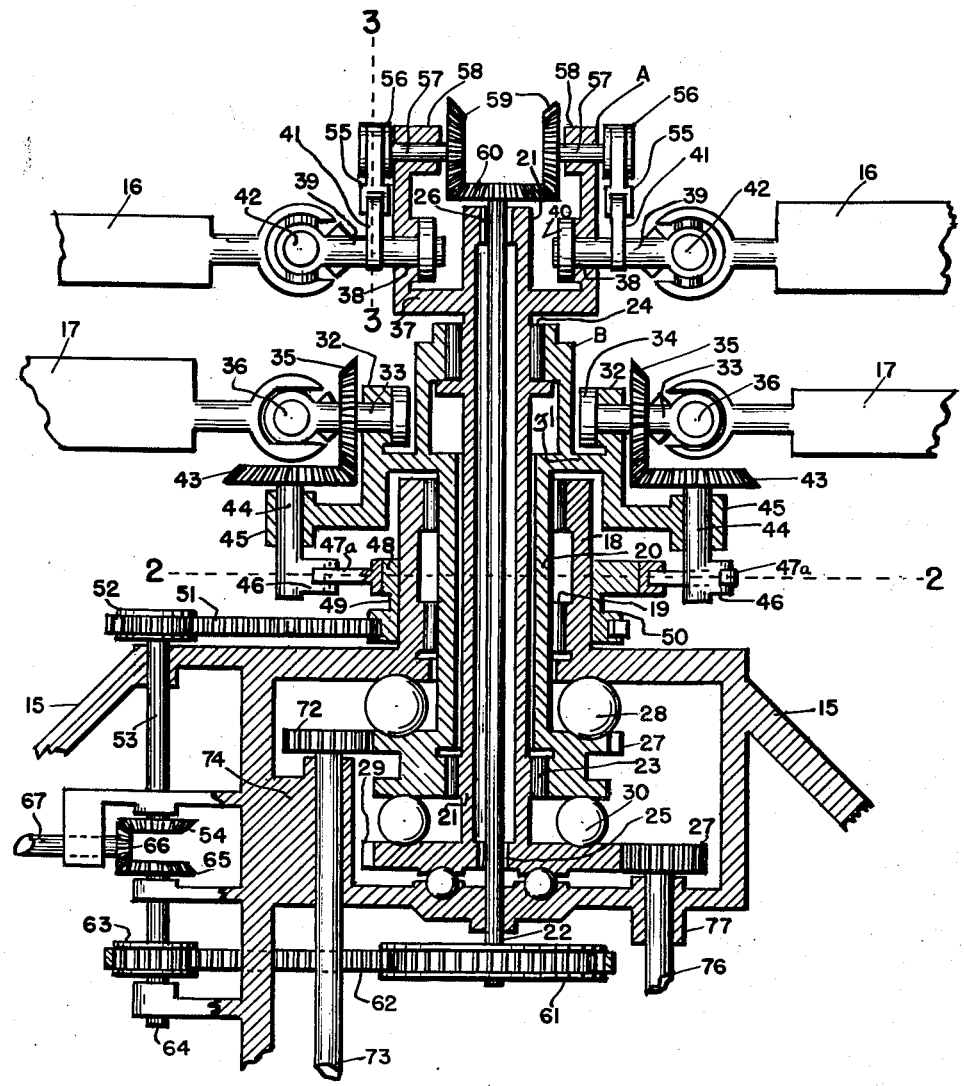

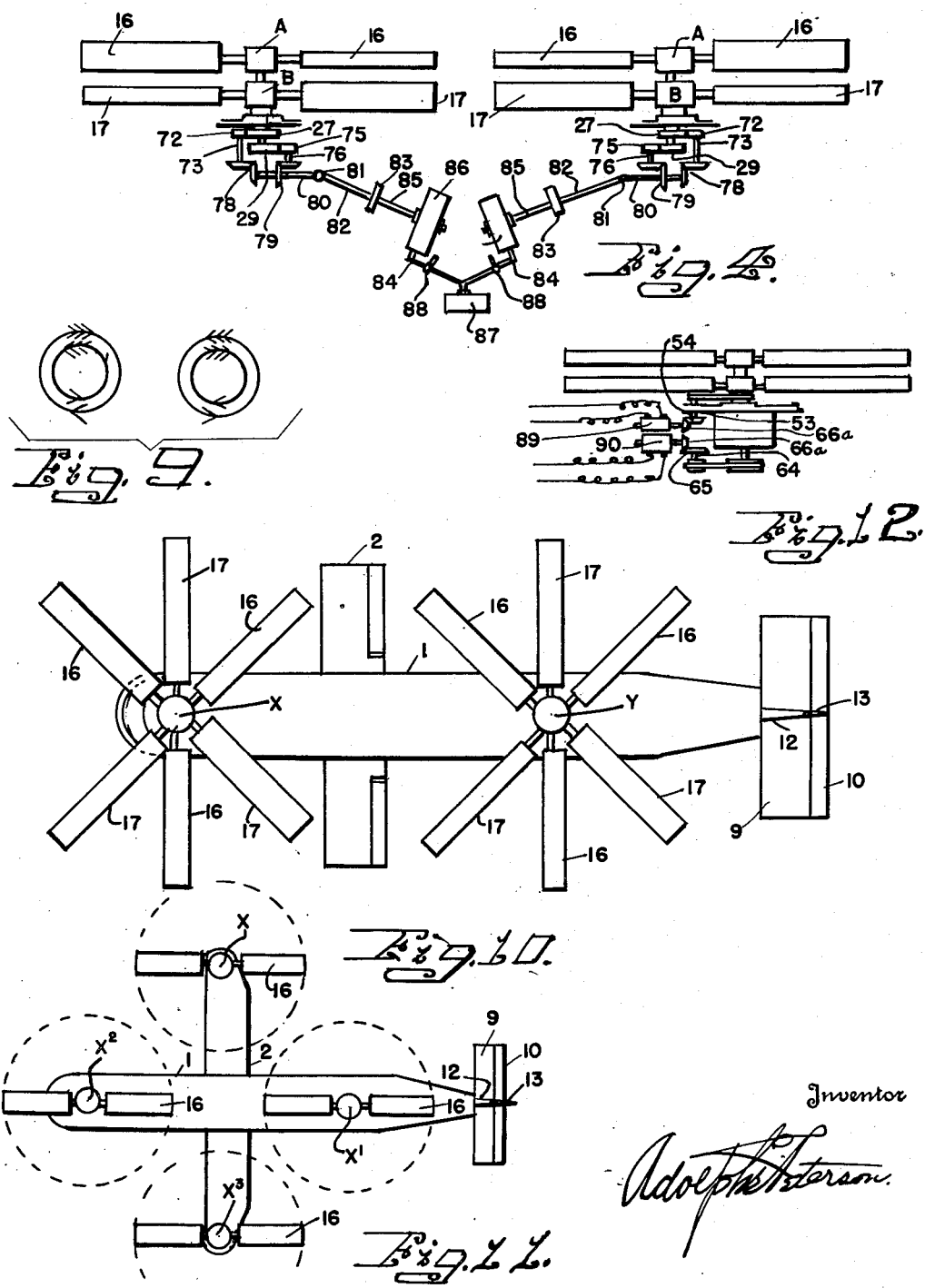

Patented Oct. 20, 1953

2,655,997

UNITED STATES PATENT OFFICE 2,655,997

HELICOPTER ROTOR ACTUATION AND CONTROL

Adolphe C. Peterson, Minneapolis, Minn.

Application February 24, 1949, Serial No. 78,185

5 Claims. (Cl. 170—135.26)

My invention relates to a means providing for sustentation and propulsion for air-borne craft, wherefore it is called, helicopter rotor actuation and control.

The chief objects of my invention are to provide a form of sustentation and propulsion means for air-craft, which means shall embody especial advantages in the use thereof in the larger form of craft wherein sustentation is principally provided by rotors, and wherein especially there are advantages of strength and simplicity in the form of the incidence varying means, which is utilized in aircraft of the helicopter type, or in lighter-than-air-craft utilizing such means as an auxiliary sustentation or lifting means and propulsion means. An object of this device is the provision of an efficient and strong means for controlling and imparting the cyclic incidence change in the blades or wings of a rotor for such air-craft. My means for incidence change provides a means changing the incidence of dual rotors mounted on a single axial sustaining or supporting means, and thereby enables efficient use of dual rotors on a single axis. My means provides an efficient incidence changing means for cyclic incidence changing, as is necessary for sustentation and propulsion in combination from a rotor means; and provides this means in a form which is simple and reliable in use and strong in its action, and as is especially adapted for use as a durable means therefore in air-craft of the helicopter type or semi-helicopter type and which may be mounted in multiple number on such air-craft, to provide for sustentation and propulsion thereby of relatively large weights, and therefore would be especially suitable for large passenger carrying craft or freight carrying craft. An object is the provision in connection therewith of efficient means for varying the direction of the propulsion effected by any one unit of such means.

The principal devices and combinations of devices comprising my invention are as hereinafter described and as defined in the claims. In the accompanying drawings which illustrate my invention, my device is shown as a unit which may be mounted in any number thereof, as in multiple number on an air-craft, and is further shown as mounted on such air-craft. Like characters refer to like parts throughout the several views.

Referring to the drawings:

Figure 1 is a view in vertical section, on a line and plane passing vertically through the axis of rotation of one of my units, and is there shown in relation to a portion of an air-craft wing or beam or mounting by which it is mounted on an air-craft, the engine driving means not being shown, the section being on the line 1—1 of Figure 2, and 1—1 of Figure 3. This figure is greatly enlarged, as compared with all other figures, except Figures 2, 3 and 5, which are on the same scale.

Figure 2 is a horizontal section at right angles to the section of Figure 1, this section being on the line 2—2 of Figure 1, and is chiefly a detail looking upwardly at part of the operating mechanism of one of the two rotors.

Figure 3 is a detail chiefly in vertical section on the line 3—3 of Figure 1 showing a cross section at right angles to the plane of Fig. 1, the eccentric and linking means of the other rotor of the device.

Figure 4 is a diagrammatic view showing two of the rotor units (each including two oppositely rotating rotors) in connection with an associated power or engine driving means for the pair of rotors, the aircraft construction not being shown except diagrammatically by a small section of supporting structure at each rotor unit.

Figure 5 is a detail diagrammatic sketch showing the relative incidence positions of blades of the two rotors of a unit in one phase of their movement.

Figure 6 is a front view of an air-craft embodying in its construction two of my rotor units for sustentation and propulsion, the units being shown on a small scale and only diagrammatically, together with the control wheel for the two rotors, as shown by dotted lines.

Figure 7 is a side view of the air-craft as shown in Fig. 6, this figure showing only the one rotor unit visible from the one side of the air-craft.

Figure 8 is a diagrammatic sketch showing the relation of propulsion of the blades in normal action.

Figure 9 is another diagrammatic sketch showing the relation of propulsion exerted by blades of the rotor units in another relation of control.

Figure 10 shows a modified form of mounting of my rotor units on an air-craft, in a fore-and-aft relation.

Fig. 11 shows a modified form of mounting of rotor units on an air-craft.

Fig. 12 shows a modified means of control for the adjustment means of a rotor unit.

It should be noted first that I contemplate that my rotor unit means may be mounted in any number of units upon an air-craft for its sustentation and propulsion, and I prefer that it be mounted in such numbers as three or four or more on an air-craft, as greater stability and reliability of the air-craft is provided by the greater number of units. I describe the rotor unit first as it may be mounted in any number, multiple or otherwise, upon an air-craft.

Referring to Figures 1, 2, 3, and 5 for the description of the novel rotor unit, the numeral 15 indicates, in these figures, a small section or portion of the associated air-craft structure or pylon mounting therein, for support of my rotor unit or one of such rotor units. This pylon mounting structure 15 is so strongly constructed that it will serve as a mounting for the revolvable rotors of a propulsion or rotor unit, which consists in the main of two blade or wing rotors, one of which is generally denoted A and the other of which is generally denoted B. The rotor A is an upper rotor and the rotor B is a lower rotor, and each of these is mounted on the same axis as its axis of rotation. Each rotor is comprised generally of two blades of the airfoil type or wing type, as shown, and has associated with it cyclic pitch control or operating means for the pair of blades, and each blade has a section such as shown in Fig. 5, or any form which will most efficiently and adequately perform the work of sustentation and propulsion as hereafter described. The rotor A has two blades each denoted 16, and the rotor B has two blades, each denoted 17. The blades of either rotor may be either more or less than two in number, and may in some constructions be as many as four or more, the construction being modified accordingly for that purpose.

The pylon mounting 15 has fixed on it a vertical static bearing fixture 18 and this bearing fixture 18 may be considered as one section of the pylon mounting. The static bearing fixture may be cylindrical in part or all in form and is very strong and supports within it by any means as usually employed a pair of roller bearings 19 (or ball bearings), these bearings being axially concentric, that axis being vertical, normally in action. The pair of bearings 19 support concentrically with bearing fixture 18 an outer rotating sleeve or cylindrical shaft 20 and a concentric sleeve or cylindrical shaft 21, and concentrically within shafts 20 and 21 a normally stationary but rotatably adjustable control shaft 22. The inner rotatable shaft 21 is rotatably mounted by a pair of roller bearings 23 and 24, respectively, one at the lower end of shaft 20 and the other at the upper end of shaft 20. The stationary and adjustable shaft 22 is mounted by small roller bearings 25 and 26, respectively, one at the lower end of shaft 21 and the other at the upper end of shaft 21.

The shaft 20 has formed or fixed on its lower end a spur gear 27 and the upper face of the latter forms a surface for rotation of the vertical thrust ball or roller bearing 28 for vertical thrust bearing between the spur gear 27 and the lower face or end of the fixed sleeve 18 and thereby between the shaft 20 and the sleeve 18. The shaft 21 has formed on its lower end a spur gear 29 and the upper end of the latter forms a surface for rotation of the vertical thrust ball or roller bearing 30 for vertical thrust bearing between the spur gear 29 and the lower face of the spur gear 27 and thereby between the lower end of shaft 21 and the spur gear 27 and through bearing 28 between shaft and fixed sleeve 18. These means thereby support the shafts 20 and 21 for concentric rotation and for vertical thrust or lift against the fixed bearing fixture 18 and thereby for vertical thrust or lift against the pylon mounting 15.

The upper end of the shaft 20 bears formed or fixed thereon a concentric drum 31 which has two horizontally disposed bearings 32, formed therein and equally spaced radially thereabout, each of these bearings 32 supporting oscillably therein one of the oscillable horizontal axles 33, of which there are two. Each of the blade axles 33, has an interior fixed or integral shoulder or flange 34 which absorbs radial or centrifugally outward pull of the associated blade in rotation, of the rotor. Each of the blade axles 33, has exteriorly of drum 31 an integral or fixed bevel gear 35 which is a so-called pitch control gear or element, and has also formed therewith and assembled therewith exteriorly of the bevel gear 35 a universal joint 36 for the airfoil or propeller blade 17 of the lower rotor B. The joint 36 of each blade 17 is preferably such that the blade 17 is fully articulated, that is such that the connections of the blades 17 to their axles 33 comprise flapping and lead-lag pivots (the axes of which, either or both may be obliquely inclined in the known manner). The support of each blade is such as to limit the inclination of the blade to the axis of its supporting shaft in the rotor, so that there will not in action be interference of the rotors, one with the other.

The upper end of the shaft 21 bears formed or fixed thereon a concentric drum 37 which has two horizontally disposed bearings 38 formed therein and equally spaced radially thereabout, each of these bearings 38 supporting oscillably therein one of the two oscillable axles 39. Each of the blade axles 39 has an interior fixed or integral shoulder flange 40 which absorbs radial or centrifugally outward pull of the associated blade in rotation, of the rotor. Each of the blade axles 39, has exteriorly of the drum 37, an integral or fixed crank-arm 41 which is a so-called pitch control element, and has also formed therewith and assembled therewith exteriorly of the crank arm 41 a universal joint 42 for the associated airfoil blade or propeller blade 16 of the rotor A. The joint 42 of each blade 16 is preferably such that the blade 16 is fully articulated, that is such that the connections of the blades 16 to their axles 39 comprise flapping and lead-lag pivots (the axes of which, either or both, may be obliquely inclined in the known manner), but the connection is also such that the blade is limited in its inclination to the axis of its shaft so that the blade may not become so much inclined as to interfere with action of the other rotor. It is contemplated that the blades of each unit, as described, may be fully articulated, or partly articulated, to swing in either or both planes, or it may be fixed firmly to its blade axle 33 or 39, as the case may be, and that these connections, are preferably such that the blades in rotation will operate as blades of rotary blade or wing sustentated air-craft, usually operate, and that they may be so fixed, to their said axles, in any manner which may prove most suitable for any particular construction, and in accordance with the specific design and its desired characteristics in flight, and that this may be in accordance with any known construction of rotors for such purpose.

The bevel gear 35 of each blade 17 is in permanent cooperation with an associated one of two bevel gears 43, and each of the latter is oscillably mounted by a short shaft 44 in a bearing 45 fixed on or integrally formed with the drum 31, and each shaft 44 has on its lower end a crank arm 46 whereby the shaft 44 and bevel gear 43 is oscillated in timed relation with the rotation of rotor B, through one master link 47 and the connected pivoted link 47a, by an eccentric 48 formed on a control sleeve 49, the latter being concentric with and mounted exteriorly of the bearing fixture 18 as a bearing. The control sleeve 49 has formed on it below eccentric 48, a sprocket wheel 50, whereby the sleeve 49 and with it the eccentric 48 may be adjusted rotatably on the axis of shaft 20 by means of the chain 51, the latter being in cooperation at its opposite end with a small sprocket wheel 52. The sprocket wheel 52 is on shaft 53, which bears bevel gear 54 at its lower end for the adjustment in unison with the other control means, as hereafter described.

The crank arm 41 of each axle 39 is in permanent cooperation through one of the two associated links 55 (eccentric straps) with an associated one of two eccentrics 56, each of which is on the exterior end of a short shaft 57, each of the latter being oscillably mounted in a bearing 58 (of two) formed in the drum 37, the shafts 57 oscillating on horizontal axes. Each of the two shafts 57 on its inner end within drum 37 bears fixed thereon a bevel gear 59 and each of the two bevel gears 59 is in permanent cooperation with one centrally disposed bevel gear 60 which is fixed on the extreme upper end of control shaft 22. The extreme lower end of control shaft 22 bears fixed thereon a sprocket wheel 61 whereby through sprocket chain 62 and sprocket wheel 63 on shaft 64, and bevel gear 65 on shaft 64, the control shaft 22 is rotated in unison with and in exactly the same degree as the rotation or adjustment of sleeve 49 by means of a common bevel gear 66 which is on shaft 67 and rotated or adjusted by means of turning of the adjustment elements by the hand control wheel 71. The rotation of the control shaft 22 and the control sleeve 49, is however, always opposite. That is, they may rotate in either direction, through control by hand wheel 71, but always they move, as to each other, in opposite directions, and accordingly their attached eccentric 48, and bevel gear 60, always rotate in opposite directions, when and if they are rotated, and their rotation is in exactly the same degree or amount in the particular direction of rotation. The rotation of these control members 48 and 60, is not more than through ninety degrees, from the forward flight condition, to procure the neutralized propulsion condition, or status, and through 180 degrees, from the forward flight condition, to procure the rearward flight condition, but may be through varying degrees of such movement, either way.

The spur gear 27 of rotary shaft 20 is in permanent cooperation with the smaller spur gear 72, and the latter is fixed on the upper end of the vertical drive shaft 73 which is rotatable in the fixed bearing 74 in the pylon mounting 15. The spur gear 29 of rotary shaft 21 is in permanent cooperation with the smaller spur gear 75, and the latter is fixed on the upper end of the vertical drive shaft 76 which is rotatable in the fixed bearing 77 in the pylon mounting 15.

The two vertical drive shafts 73 and 76, which impart the rotating movement of the rotors B and A, respectively, through the spur gears 27 and 29, and rotary shafts 20 and 21, respectively, are driven through the two sets of bevel gears 78 and 79, respectively, by the single propeller shaft 80, the latter being rotatable in any fixed bearing (not shown) in the fuselage structure or its wing structure. The placing of the bevel gears of sets 78 and 79 is such that the two vertical drive shafts 73 and 76 are driven in opposite directions and thus the rotary shafts 20 and 21 are also always driven in opposite direction, and the direction of driving is such as to each, as to produce the propulsion effects hereafter described. The shafts 73 and 76 may be mounted in any auxiliary bearings, not shown, as may be necessary.

The propeller shaft 80 is driven through the universal joint 81 and shaft 82 and engine crank shaft 85 through one-way clutch or over-running means 83 by the engine 86, whose crank shaft 85 is always driven in one direction to cause the correct propulsive effects of the rotors A and B. The engine 86 may be of any type, such as internal combustion engine or turbine and it is supplied with fuel by a conduit 84 from a common supply tank 87. The supply of fuel may be controlled to increase or diminish the power and speed of the engine 86 by means of a control illustrated as 88. This control may be of any type which will best accomplish change of the power output so that the control effects as hereafter stated, may be achieved. By the control of the engine power out-put, the driving power and propulsive effect (which may be neutralized as hereafter described) and lift effect of the rotors A and B, may be controlled, as necessary, to give increased propulsion and lift effect, or only lift effect proportioned to the power output, for the propulsion of the air-craft, or the propulsion and climb or only for climb effect, as hereafter described. While I have described this change of lift effect as procured by the change of engine power output, any other means may be used, such as increasing or diminishing of the angle of incidence of rotor blades, to increase the climb effect.

Referring now to Figures 6 and 7, wherein the rotor units are shown as incorporated with an aircraft structure, there are here shown two such rotor-units, as I have described, each having two rotors A and B, as above described in connection with one rotor unit, and these two rotor units are mounted, one at each end of a wing structure 2 which is part of an air-craft structure having fuselage 1. The air-craft structure has wheel mountings 3, landing wheels 4, these being the main weight carrying wheels, steering wheel 5 carried by pivotable mounting 6, observation window 7, rearwardly extending empennage 8, rear stabilizer wing 9, elevator 10 pivotably fixed thereon and having any of the usual control means, side ailerons or control wings 11, (also controlled by any means not shown) vertical stabilizer 12, vertical rudder 13 (controlled as usual, not shown). The pylon mountings 15 of the two rotor units A and B, are one at each end of wing structure 2. It will be seen in Figure 6 that each of the two rotor units, which may be designated X and Y, generally, have the control shaft 67 and the control wheel 71. Each of the rotor units X and Y may accordingly be separately controlled by the pilot. Any means for unifying this control may be utilized if that be found advisable.

Having described in detail the construction of the rotor unit (X or Y), the operation of either of the rotor units is now first briefly described: The engine 86 of the rotor unit may be placed in operation by any starting means (not shown)

and controlled by means 88, to start the shafts 73 and 76 in rotation in their oppositely rotating directions.

In operation, as rotary shaft 20 revolves, the master link 47 and the connected pivoted link 47a are carried around eccentric 48 whereby cranks 46 of rotor B are reciprocated and thereby bevel gears 43 are oscillated and oscillate bevel gears 35 and thereby oscillate axles 33 of blades 17 so that blades 17 are slightly oscillated, but sufficiently, so that in the propulsive movements of blades 17, which will be rearwardly of the aircraft for forward flight, the blades 17 have a greater pitch angle than they have in the nonpropulsive phases of the movements or rotation, that is the phases during which a blade 17 is moving forwardly as compared with direction of flight, the blades will have the lower angle of incidence. Thus pitch angle is deepened during rearward movement of any blade in its cycle, as compared with the forward direction of flight, and the pitch angle is lessened during the forward movement of any blade in its cycle of rotation of the rotor B.

Likewise in rotation of rotor A, the pitch angle of blades 16 of rotor A are given a cyclic change of pitch angle to produce the propulsive effect for forward direction of flight. In the case of rotor A the rotation of drum 37 with its blades 16, causes bevel gears 59 to be propelled around the periphery of level gear 60, which is stationary (except as adjustable) and this movement causes gears 59 with their shafts 57 to turn continuously once for each rotation of drum 37 and this rotation of shafts 57 causes eccentrics 56 to rotate within eccentric straps 55 once for each rotation of drum 37, whereby the straps are cyclically given a reciprocating movement which is imparted to cranks 41 in the same cyclic phase as eccentrics 56 move, and thereby the axles 39 of blades 16 are oscillated as necessary to produce the cyclic increasing of the pitch angle of any blade 16. Phases are such (as to each rotor A and B), as to produce the deepening of pitch angle of any one blade of one rotor, as it moves on one side of the vertical axis of rotation, for either forward propulsive effects or for the opposite direction of propulsion. The phases of deepest incidence of rotors A and B of the unit, may be simultaneously altered for the unit by means of the independent control wheel 71, whereby the sleeve 49 and bevel gear 60 are moved in opposite directions, for control of the phase periods of the blades of the rotors A and B. The horizontal propulsion effect of the pair of rotors A and B of a unit X or Y may be altered either for complete neutralization of propulsion (without impairing lift effect) or for change of direction of the propulsion, in any unit X or Y. Propulsion effect may also be neutralized by making propulsion effect horizontally, in opposite directions transversely of the aircraft, as to the two rotor units X and Y, by the control wheels 71—71. Or propulsive effect of one rotor unit X may be in direction, say forwardly, and that of unit Y in the other direction, say rearwardly, thereby producing a turning effect on the air-craft. The hand wheels 71—71 of the units X and Y are shown as independently operable in order that the pilot may have complete control in this manner, while at all times the lift effects are proportional to the power output of the engines 86—86, within reasonable limits. The wing structure 2 will provide some lift effect in forward flight, and the craft may be constructed as to always utilize this effect, assuming that the craft will always be operated from or to the usual landing strips, but the structure is not necessarily limited that way. The ailerons 11 and rudder 13 and elevator 10 may be utilized to assist in control of the air craft in flight, especially in ascending or descending, for guidance of the air craft in horizontal direction or vertical direction or for balancing of the air craft. The wing structure 2 may especially be used to assist in climbing effect, while the craft is forwardly propelled by the rotor units X and Y.

Referring now to Figure 10, this figure shows a different placing of rotor units X and Y on an air-craft, the said units being in this form placed in the longitudinal axis of the fuselage, one forward and the other over the rear end of the air craft, each supported thereon as the units are supported in the first form shown. Each unit is separately controlled as in the first case described.

Referring now to Figure 11, this figure shows a different placing of rotors denoted respectively, X, $X^1$, $X^2$, $X^3$, on an air-craft, the said rotor units being in this form placed one fore and one aft along the longitudinal axis of the air-craft, and the two others are placed at the ends of a wing structure as in Figure 6 and at a location which is with regards to length of the air-craft, intermediately of the two other rotor units $X^1$ and $X^2$. Thus this form has four rotor units, each having two rotors A and B, as in the first form described and each of the rotor units is separately controlled as in the first form described, or as described in connection with Fig. 12, hereafter. By the separate control of each of the four rotor units in this form, the pilot can achieve any degree of control over the direction of travel of the craft and varying degrees of forward or rearward travel, without at any time altering the sustentation of the rotor units relative to the craft as a whole, and in this manner stability in large air-craft is easily maintained, by the pilot in flight.

Referring to Figure 12, this figure shows a modified form of control which may be used for each of the rotor units as employed in any of the forms of mounting of the rotor units on an air-craft. In this modified control, the shafts 53 and 64 which individually adjust the positions of the elements 49—48 of one rotor and 22—60 of the other rotor, are each independently controlled by means of separate gears $66^a$ and $66^b$ engaging bevel gears 54 and 65, respectively, and the gears $66^a$ and $66^b$ are operated by electric motors 89 and 90, respectively, so that the pilot may by any electric switching means (not shown) cause either motor 89 or 90 to be operated in either direction for driving of the associated shafts 53 and 64 in either direction, independently of the other. In this manner independent control of either the elements 49—48 or element 60, in a rotor unit, may be effected and a more varied control of the rotor unit may be effected by the pilot, thus effecting a more greatly variable control of the propulsion by the rotor units.

The form of control shown in Figure 12 may be used in the rotor units for any type of mounting of the rotor units on an air-craft, so that an efficient control is achieved, with such degree of stability in any type of air-craft as is desired.

I contemplate that my form of rotor unit will preferably be used in multiple number on an air-craft in order that stability will more readily be achieved in flight of the air-craft, and in order that control of the air-craft for change of the propulsion of the rotor units, horizontally, may be effected more readily without effect upon the stability of the air-craft, and also in order that greater variability of the climb effect may be achieved.

While I have shown my device in a particular form and use, I contemplate that my device may be constructed with variation in its details and with variation in its use, without departure from the spirit and contemplation of my invention, and I especially contemplate that application of the propulsive power of an engine to the rotors of a unit or units may be effected in any manner, and within the scope and contemplation of my invention.

What I claim is:

1. In an air-craft, a pylon mounting having a static bearing fixture fixed therewith; a first rotor hub unit mounted in the bearing fixture to rotate on a vertical axis and having air-foil blades each mounted in the rotor hub unit to have oscillation on an axis extending in the horizontal plane as substantially a radius of the circle about the axis of the rotor hub unit, each air-foil blade having a bevel gear fixed therewith, the rotor hub unit having oscillatable shafts mounted substantially on vertical axes in the rotor hub unit, each oscillatable shaft having fixed thereon a bevel gear inter-engaged with the bevel gear of an associated air-foil blade, each oscillatable shaft having a crank fixed thereon; a second rotor hub unit mounted in the bearing fixture to rotate on an axis co-incidental with the axis of the first rotor hub unit, the second rotor hub unit having air-foil blades each mounted in the said second rotor hub unit to have oscillation on an axis extending in the horizontal plane as substantially a radius of the circle about the axis of the rotor hub unit, each air-foil blade of the second rotor hub unit having a crank fixed therewith radially of the axis of the oscillation of the air-foil blade, the second rotor hub unit having shafts oscillatably mounted therein each on an axis substantially parallel to the axis of oscillation of an associated one of the air-foil blades, each last named oscillatable shaft having fixed thereon an eccentric and a bevel gear the eccentric having inter-connection with the crank of the associated air-foil blade by an eccentric link; a normally static control bevel gear fixed on the pylon mounting, the said control bevel gear having inter-engagement with each of said bevel gears of said second rotor hub unit; a normally static control eccentric mounted on said bearing fixture, an eccentric strap rotatably mounted on said control eccentric, links spaced about the eccentric and connecting the eccentric strap with each crank of said first rotor hub unit; and means connected and for rotating the rotor hub units in opposite directions.

2. In an air-craft, a pylon mounting having a static bearing fixture fixed therewith; a first rotor hub unit mounted in the bearing fixture to rotate on a vertical axis and having air-foil blades each mounted in the rotor hub unit to have oscillation on an axis extending in the horizontal plane as substantially a radius of the circle about the axis of the rotor hub unit, each said air-foil blade having a bevel gear fixed therewith, the said rotor hub unit having oscillatable shafts mounted substantially on vertical axes in the rotor hub unit, each oscillatable shaft having fixed thereon a bevel gear inter-engaged with the said bevel gear of an associated air-foil blade and each oscillatable shaft having a crank fixed thereon; a second rotor hub unit mounted in the bearing fixture to rotate on an axis co-incidental with the axis of the first rotor hub unit, the second rotor hub unit having air-foil blades each mounted in the said second rotor hub unit to have oscillation on an axis extending in the horizontal plane as substantially a radius of the circle about the axis of the rotor hub unit, each said air-foil blade having a crank fixed therewith radially of the axis of the oscillation of the air-foil blade, the said second rotor hub unit having shafts oscillatably mounted therein each on an axis substantially parallel to the axis of oscillation of an associated air-foil blade, each said last named oscillatable shaft having fixed thereon an eccentric and a bevel gear the eccentric having inter-connection with the crank of the associated air-foil blade by an eccentric link; a normally static control bevel gear fixed on the pylon mounting, the said control bevel gear having inter-engagement with each of said bevel gears of said second rotor hub unit; a normally static control eccentric mounted on said bearing fixture, an eccentric strap rotatably mounted on said control eccentric, links spaced about the eccentric and connecting the eccentric strap with each crank of said first rotor hub unit; the said control bevel gear having rotatable mounting on an axis co-incidental with the axis of the rotor hub units and having an adjusting element fixed therewith; the said control eccentric having rotatable mounting on said bearing fixture to be rotatable on an axis co-incidental with the axes of the rotor hub units and having an adjusting element fixed therewith; and a coordinating control means connected for rotating the said control bevel gear and the said control eccentric in opposite directions.

3. In an air-craft, a pylon mounting having a static bearing fixture fixed therewith; a first rotor hub unit mounted in the bearing fixture to rotate on a vertical axis and having air-foil blades each mounted in the rotor hub unit to have oscillation on an axis extending in the horizontal plane as substantially a radius of the circle about the axis of the rotor hub unit, each said air-foil blade having a bevel gear fixed therewith, the rotor hub unit having oscillatable shafts mounted substantially on vertical axes in the rotor hub unit, each oscillatable shaft having fixed thereon a bevel gear inter-engaged with the said bevel gear of an associated air-foil blade and each oscillatable shaft having a crank fixed thereon; a second rotor hub unit mounted in the bearing fixture to rotate on an axis co-incidental with the axis of the first rotor hub unit, the second rotor hub unit having air-foil blades each mounted in the said second rotor hub unit to have oscillation on an axis extending in the horizontal plane as substantially a radius of the circle about the axis of the rotor hub unit, each said air-foil blade having a crank fixed therewith radially of the axis of the oscillation of the air-foil blade, the said second rotor hub unit having shafts oscillatably mounted therein each on an axis substantially parallel to the axis of oscillation of an associated air-foil blade, each said last-named oscillatable shaft having fixed thereon an eccentric and a bevel gear the eccentric having inter-connection with the crank of the associated air-foil blade by an eccentric link; a normally static control bevel gear fixed on the pylon mounting, the said control bevel gear having inter-engagement with each of said bevel gears of said second rotor hub unit; a normally static control eccentric mounted on said bearing fixture, an eccentric strap rotatably mounted on said control eccentric, links spaced about the eccentric and connecting the eccentric strap with each crank of said first rotor hub unit; the said control bevel gear having rotatable mounting on an axis co-incidental with the axis of the rotor hub units and having control adjusting means connected and in cooperation therewith to rotate the control bevel gear; the control eccentric having rotatable mounting on said bearing fixture to be rotatable on an axis co-incidental with the axes of the rotor hub units and having control adjusting means connected and in cooperation therewith to rotate the control eccentric.

4. All of the means as described and as claimed in claim 1 and in combination therewith; the said control bevel gear having rotatable mounting on an axis co-incidental with the axis of the rotor hub units and having an adjusting wheel rotatably fixed therewith; the said control eccentric having rotatable mounting on said bearing fixture to be rotatable on an axis co-incidental with the axes of the rotor hub units, and having an adjusting wheel rotatably fixed therewith; and common adjusting wheel means in inter-engagement with said first named adjusting wheel and said second named adjusting wheel to procure adjusting rotation of said control bevel gear and said control eccentric in opposite directions.

5. All the means as described and as claimed in claim 1 and in combination; means to rotate the said normally static control bevel gear on its axis and means to rotate the said normally static control eccentric on its axis.

ADOLPHE C. PETERSON.

References Cited in the file of this patent

UNITED STATES PATENTS

| Number | Name | Date |
|---|---|---|
| 1,449,129 | Pescara | Mar. 20, 1923 |
| 2,364,496 | Vogel | Dec. 5, 1944 |
| 2,414,435 | Bendix | Jan. 21, 1947 |
| 2,415,999 | Frasher | Feb. 8, 1947 |
| 2,506,210 | Goodson et al. | May 2, 1950 |

FOREIGN PATENTS

| Number | Country | Date |
|---|---|---|
| 10,467 | Great Britain | Nov. 18, 1909 |
| 610,434 | Germany | Mar. 12, 1935 |